United States Patent
Hong

(10) Patent No.: US 11,082,877 B2
(45) Date of Patent: Aug. 3, 2021

(54) METHOD AND DEVICE FOR CONFIGURING OPERATING BANDWIDTH

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/348,930

(22) PCT Filed: Nov. 11, 2016

(86) PCT No.: PCT/CN2016/105466
§ 371 (c)(1),
(2) Date: May 10, 2019

(87) PCT Pub. No.: WO2018/086063
PCT Pub. Date: May 17, 2018

(65) Prior Publication Data
US 2019/0281489 A1 Sep. 12, 2019

(51) Int. Cl.
*H04W 28/02* (2009.01)
*H04L 5/00* (2006.01)
(Continued)

(52) U.S. Cl.
CPC ....... *H04W 28/0215* (2013.01); *H04L 5/0044* (2013.01); *H04L 5/0064* (2013.01);
(Continued)

(58) Field of Classification Search
CPC .......... H04W 28/0215; H04W 72/121; H04W 72/0453; H04W 72/048; H04L 5/0044; H04L 5/0064
(Continued)

(56) References Cited

U.S. PATENT DOCUMENTS

| | | | | |
|---|---|---|---|---|
| 2005/0233752 A1* | 10/2005 | Laroia | ................... | H04L 5/0007 455/450 |
| 2011/0096745 A1* | 4/2011 | Ahn | ....................... | H04L 1/1861 370/329 |
| 2014/0199067 A1* | 7/2014 | Ahuja | ................ | H04Q 11/0066 398/52 |

FOREIGN PATENT DOCUMENTS

| | | | |
|---|---|---|---|
| CN | 102083150 A | | 6/2011 |
| CN | 102378370 A | | 3/2012 |

(Continued)

OTHER PUBLICATIONS

First Office Action dated Jun. 27, 2019, in counterpart Chinese Application No. 201680001341.8 and English translation thereof.
(Continued)

*Primary Examiner* — Faruk Hamza
*Assistant Examiner* — Jean F Voltaire
(74) *Attorney, Agent, or Firm* — Finnegan, Henderson, Farabow, Garrett & Dunner, L.L.P.

(57) ABSTRACT

Embodiments of the present disclosure provide a method and a device for configuring an operating bandwidth and relate to the field of mobile communication technology. The method includes: obtaining bandwidth capacity parameters of user equipment (UE), wherein the bandwidth capacity parameters include a maximum operating bandwidth, a minimum operating bandwidth and a frequency band range that are supported by the UE; determining bandwidth configuration information of the UE according to the bandwidth capacity parameters, wherein the bandwidth configuration information includes a carrier identifier, an operating bandwidth and an operating frequency of each of at least one carrier, a sum of the operating bandwidths of all the carriers is not less than the minimum operating bandwidth and not more than the maximum operating bandwidth, and the operating frequency of each carrier is within the frequency (Continued)

band range; and sending the bandwidth configuration information to the UE, wherein the bandwidth configuration information is configured to aggregate the at least one carrier into an operating carrier by the UE. In the present disclosure, as the base station could dynamically configure the operating bandwidth for the UE according to the bandwidth capacity parameters of the UE, the bandwidth in the base station could be reasonably configured. Thus, the bandwidth utilization ratio is increased.

17 Claims, 7 Drawing Sheets

(51) Int. Cl.
  *H04W 72/04* (2009.01)
  *H04W 72/12* (2009.01)
(52) U.S. Cl.
  CPC ..... *H04W 72/048* (2013.01); *H04W 72/0453* (2013.01); *H04W 72/121* (2013.01)

(58) Field of Classification Search
  USPC ........................................................ 370/329
  See application file for complete search history.

(56) References Cited

FOREIGN PATENT DOCUMENTS

| | | |
|---|---|---|
| CN | 103493557 A | 1/2014 |
| CN | 104782201 A | 7/2015 |
| CN | 105075147 A | 11/2015 |
| CN | 105813202 A | 7/2016 |
| WO | WO 2012000177 A1 | 1/2012 |
| WO | WO 2014/112848 A1 | 7/2014 |
| WO | WO-2014112848 A1 * | 7/2014 .............. H04W 8/24 |

OTHER PUBLICATIONS

International Search Report and Written Opinion of PCT/CN2016/105466, dated Aug. 22, 2017.

* cited by examiner

US 11,082,877 B2

METHOD AND DEVICE FOR CONFIGURING OPERATING BANDWIDTH

CROSS REFERENCE TO RELATED APPLICATIONS

This application is a national phase application based on PCT/CN2016/105466, filed Nov. 11, 2016, the content of which is incorporated herein by reference.

TECHNICAL FIELD

The present disclosure relates to the field of mobile communication technology, and in particular to a method and a device for configuring an operating bandwidth.

BACKGROUND

In the past 30 years, mobile communication has experienced a leap from voice service to mobile bandwidth data service, namely, from a 2G (second-generation, second-generation mobile communication technology) network to a 5G (fifth-generation, fifth generation mobile communication technology) network. In the 5G network, a base station will meet the requirements for ultra-high traffic density, ultra-high connection density, and ultra-high mobility of UEs (User Equipment), thereby providing users with ultimate service experiences, e.g., high-definition videos, virtual reality, augmented reality, cloud desktops, online games and the like.

In the 5G network, when a UE accesses a base station, the base station configures an operating bandwidth which is a fixed bandwidth for the UE; and when data are transmitted between the UE and the base station, the UE performs data transmission with the base station through the operating bandwidth.

SUMMARY

To overcome the problems existed in the related art, the present disclosure provides a method and a device for configuring an operating bandwidth, and the technical solutions are as follows.

In a first aspect, the present disclosure provides a method applied to a base station for configuring an operating bandwidth, comprising:

obtaining bandwidth capacity parameters of a User Equipment (UE), wherein the bandwidth capacity parameters comprise a maximum operating bandwidth, a minimum operating bandwidth and a frequency band range that are supported by the UE;

determining bandwidth configuration information of the UE according to the bandwidth capacity parameters, wherein the bandwidth configuration information comprises a carrier identifier, an operating bandwidth and an operating frequency of each of at least one carrier, the sum of the operating bandwidths of all the carriers is not less than the minimum operating bandwidth and not more than the maximum operating bandwidth, and the operating frequency of each carrier is within the frequency band range;

sending the bandwidth configuration information to the UE, wherein the bandwidth configuration information is configured to aggregate the at least one carrier into an operating carrier by the UE.

In the embodiments of the present disclosure, the base station obtains bandwidth capacity parameters of a UE, including a maximum operating bandwidth, a minimum operating bandwidth and a frequency band range that are supported by the UE. Bandwidth configuration information of the UE, including a carrier identifier, an operating bandwidth and an operating frequency of each of at least one carrier, is determined according to the bandwidth capacity parameters, and sent to the UE, such that the UE aggregates the at least one carrier into an operating carrier according to the bandwidth configuration parameters. As the base station can dynamically configure the operating bandwidth for the UE according to the bandwidth capacity parameters, the bandwidth in the base station can be reasonably configured. Thus, the bandwidth utilization ratio is increased.

In an optional embodiment, prior to the obtaining bandwidth capacity parameters of UE, further comprising:

obtaining amount of data to be transmitted corresponding to the UE and a current first operating bandwidth of the UE, determining a second operating bandwidth required by the UE according to the data amount, and if a difference between the first operating bandwidth and the second operating bandwidth is greater than a preset threshold, performing the step of obtaining bandwidth capacity parameters of UE.

In the embodiments of the present disclosure, the base station adjusts the operating bandwidth of the UE according to the amount of the data to be transmitted corresponding to the UE, thereby improving not only the bandwidth utilization but also the data transmission rate.

In an optional embodiment, the obtaining bandwidth capacity parameters of UE comprises:

receiving the bandwidth capacity parameters sent by the UE, or obtaining the bandwidth capacity parameters from subscription information of the UE.

In the embodiments of the present disclosure, the base station may obtain the bandwidth capability parameter sent by the UE, or obtain the bandwidth capability parameter from the subscription information of the UE, which extends the manners of obtaining the bandwidth capability parameter, thereby enriching the applicable scenario.

In an optional embodiment, the determining bandwidth configuration information of the UE according to the bandwidth capacity parameters comprises:

determining an adjusted bandwidth and a bandwidth adjustment type of the UE;

if the bandwidth adjustment type is a bandwidth increase and a current idle bandwidth in the base station is not less than the adjusted bandwidth, calculating the sum of the current first operating bandwidth and the adjusted bandwidth of the UE to obtain a third operating bandwidth, and determining, according to the frequency band range, at least one carrier of the base station, of which the operating frequency is within the frequency band range and the sum of the operating bandwidths is the third operating bandwidth;

if the bandwidth adjustment type is a bandwidth decrease, calculating a difference between the current first operating bandwidth and the adjusted bandwidth of the UE to obtain a fourth operating bandwidth, and determining, according to the frequency band range, at least one carrier of the base station, of which the frequency is within the frequency band range and the sum of the operating bandwidths is the fourth operating bandwidth; and forming the bandwidth configuration information by the carrier identifier, the operating bandwidth and the operating frequency of each of the at least one carrier.

In the embodiments of the present disclosure, the base station may adjust the current operating bandwidth of the UE by using a fixed adjusted bandwidth, thereby achieving reasonable allocation of bandwidths in the base station and improving the bandwidth utilization ratio.

In an optional embodiment, the determining bandwidth configuration information of the UE according to the bandwidth capacity parameters comprises:

determining a bandwidth adjustment type of the UE:

if the bandwidth adjustment type is a bandwidth increase and a current idle bandwidth in the base station is not less than a difference between the maximum operating bandwidth and the current first operating bandwidth of the UE, determining, according to the frequency band range, at least one carrier of the base station, of which the frequency is within the frequency band range and the sum of the operating bandwidths is the maximum operating bandwidth;

if the bandwidth adjustment type is a bandwidth decrease, determining, according to the frequency band range, at least one carrier of the base station, of which the frequency is within the frequency band range and the sum of the operating bandwidths is the minimum operating bandwidth; and forming the bandwidth configuration information by the carrier identifier, the operating bandwidth and the operating frequency of each of the at least one carrier.

In the embodiments of the present disclosure, if the bandwidth adjustment type is a bandwidth increase and there is enough current idle bandwidth in the base station, the base station may directly adjust the operating bandwidth of the UE to the maximum operating bandwidth supported by the UE, which could improve the adjust efficiency and thereby improve the data transmission efficiency. If the bandwidth adjustment type is a bandwidth decrease, the base station may directly adjust the operating bandwidth of the UE to the minimum working bandwidth supported by the UE, which may improve the adjustment efficiency. As such, the base station could free up more idle bandwidth for subsequent allocation to other UEs, which improves the bandwidth utilization ratio.

In the embodiments of the present disclosure, the base station can dynamically configure the operating bandwidth for the UE according to the bandwidth capability parameter of the UE, so that the bandwidth in the base station can be reasonably configured. Thus, the bandwidth utilization ratio is increased.

In an optional embodiment, prior to the sending bandwidth capacity parameters of the UE to a base station accessed by the UE, further comprising:

obtaining an amount of data to be transmitted corresponding to the UE and a current first operating bandwidth of the UE;

determining a second operating bandwidth required by the UE according to the data amount, and if a difference between the first operating bandwidth and the second operating bandwidth is more than a preset threshold, performing the step of sending the bandwidth capacity parameters of the UE to the base station accessed by the UE.

In the embodiments of the present disclosure, the UE adjusts the operating bandwidth of the UE according to the amount of the data to be transmitted corresponding to the UE, thereby improving not only the bandwidth utilization ratio but also the data transmission rate.

In a third aspect, the present disclosure provides a device for configuring an operating bandwidth, comprising:

a first obtaining module configured to obtain bandwidth capacity parameters of a UE, wherein the bandwidth capacity parameters comprise a maximum operating bandwidth, a minimum operating bandwidth and a frequency band range that are supported by the UE;

a first determination module configured to determine bandwidth configuration information of the UE according to the bandwidth capacity parameters, wherein the bandwidth configuration information comprises a carrier identifier, an operating bandwidth and an operating frequency of each of at least one carrier, the sum of the operating bandwidths of all the carriers is not less than the minimum operating bandwidth and not more than the maximum operating bandwidth, and the operating frequency of each carrier is within the frequency band range; and a first sending module configured to send the bandwidth configuration information to the UE, wherein the bandwidth configuration information is configured to aggregate the at least one carrier into an operating carrier by the UE.

In an optional embodiment, the device further comprises:

a second obtaining module configured to obtain an amount of data to be transmitted corresponding to the UE and a current first operating bandwidth of the UE; and a second determination module configured to determine a second operating bandwidth required by the UE according to the data amount, wherein the first obtaining module is configured to obtain the bandwidth capacity parameters if a difference between the first operating bandwidth and the second operating bandwidth is more than a preset threshold.

In an optional embodiment, the first obtaining module is further configured to receive the bandwidth capacity parameters sent by the UE; or the first obtaining module is further configured to obtain the bandwidth capacity parameters from subscription information of the UE.

In an optional embodiment, the first determination module comprises:

a first determination unit configured to determine an adjusted bandwidth and a bandwidth adjustment type of the UE;

a second determination unit configured to calculate the sum of the current first operating bandwidth and the adjusted bandwidth of the UE to obtain a third operating bandwidth and to determine, according to the frequency band range, at least one carrier of the base station, of which the operating frequency is within the frequency band range and the sum of the operating bandwidths is the third operating bandwidth, if the bandwidth adjustment type is a bandwidth increase and a current idle bandwidth in the base station is not less than the adjusted bandwidth;

a third determination unit configured to calculate a difference between the current first operating bandwidth and the adjusted bandwidth of the UE to obtain a fourth operating bandwidth, and to determine, according to the frequency band range, at least one carrier of the base station, of which the frequency is within the frequency band range and the sum of the operating bandwidths is the fourth operating bandwidth, if the bandwidth adjustment type is a bandwidth decrease; and a first forming unit configured to form the bandwidth configuration information by the carrier identifier, the operating bandwidth and the operating frequency of each of the at least one carrier.

In an optional embodiment, the first determination module comprises:

a fourth determination unit configured to determine a bandwidth adjustment type of the UE:

a fifth determination unit configured to determine, according to the frequency band range, at least one carrier of the base station, of which the frequency is within the frequency band range and the sum of the operating bandwidths is the maximum operating bandwidth, if the bandwidth adjustment type is a bandwidth increase and a current idle bandwidth in the base station is not less than a difference between the maximum operating bandwidth and the current first operating bandwidth of the UE;

a sixth determination unit configured to determine, according to the frequency band range, at least one carrier of the base station, of which the frequency is within the frequency band range and the sum of the operating bandwidths is the minimum operating bandwidth, if the bandwidth adjustment type is the bandwidth decrease; and a second forming unit configured to form the bandwidth configuration information by the carrier identifier, the operating bandwidth and the operating frequency of each of the at least one carrier.

In a fourth aspect, the present disclosure provides a device for configuring an operating bandwidth, comprising:

a second sending module configured to send bandwidth capacity parameters of a UE to a base station accessed by the UE, to enable that the base station determines the bandwidth configuration information of the UE according to the bandwidth capacity parameters;

a receiving module configured to receive the bandwidth configuration information from the base station, and to form the bandwidth configuration information by a carrier identifier, an operating bandwidth and an operating frequency of each of at least one carrier; and an aggregation module configured to aggregate all the carriers into an operating carrier according to the carrier identifier, the operating bandwidth and the operating frequency of each carrier.

In an optional embodiment, the device according to claim 13, further comprising:

a third obtaining module configured to obtain an amount of data to be transmitted corresponding to the UE and a current first operating bandwidth of the UE; and a third determination module configured to determine a second operating bandwidth required by the UE according to the data amount, and the second sending module is configured to send the bandwidth capacity parameters of the UE to the base station accessed by the UE if a difference between the first operating bandwidth and the second operating bandwidth is more than a preset threshold.

In a fifth aspect, the present disclosure provides a device for configuring an operating bandwidth, comprising:

a processor; and a memory for storing an executable instruction of the processor, wherein the processor is configured to:

obtain bandwidth capacity parameters of a UE comprising a maximum operating bandwidth, a minimum operating bandwidth and a frequency band range that are supported by the UE;

determine bandwidth configuration information of the UE according to the bandwidth capacity parameters, the bandwidth configuration information comprises a carrier identifier, an operating bandwidth and an operating frequency of each of at least one carrier, the sum of the operating bandwidths of all the carriers is not less than the minimum operating bandwidth and not more than the maximum operating bandwidth, and the operating frequency of each carrier is within the frequency band range; and send the bandwidth configuration information to the UE, wherein the bandwidth configuration information is configured to aggregate at least one carrier into an operating carrier by the UE.

In a sixth aspect, the present disclosure provides device for configuring an operating bandwidth, comprising:

a processor; and a memory for storing an executable instruction of the processor, wherein the processor is configured to:

send bandwidth capacity parameters of a UE to a base station accessed by the UE, to enable that the base station determines bandwidth configuration information of the UE according to the bandwidth capacity parameters;

receive the bandwidth configuration information from the base station, and form the bandwidth configuration information by a carrier identifier, an operating bandwidth and an operating frequency of each of at least one carrier; and aggregate all the carriers into an operating carrier according to the carrier identifier, the operating bandwidth and the operating frequency of each carrier.

The embodiments of the present disclosure provide the following advantageous effects. In the embodiments of the present disclosure, a base station obtains bandwidth capacity parameters of a UE, including a maximum operating bandwidth, a minimum operating bandwidth and a frequency band range that are supported by the UE. Bandwidth configuration information of the UE, including a carrier identifier, an operating bandwidth and an operating frequency of each of at least one carrier, is determined according to the bandwidth capacity parameters, and sent to the UE, such that the UE aggregates the at least one carrier into an operating carrier according to the bandwidth configuration parameters. As the base station can dynamically configure the operating bandwidth for the UE according to the bandwidth capacity parameters, the bandwidth in the base station can be reasonably configured. Thus, the bandwidth utilization ratio is increased.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and form a part of this specification, illustrate embodiments consistent with the present disclosure and, together with the description, serve to explain the principles of the present disclosure.

DETAILED DESCRIPTION

The implementations of the present disclosure will be described in further detail with reference to the accompanying drawings, to present the objects, technical solutions, and advantages of the present disclosure more clearly.

Reference will now be made in detail to exemplary embodiments, examples of which are illustrated in the accompanying drawings. When the following description relates to the accompanying drawings, the same numbers in different drawings represent the same or similar elements, unless otherwise represented. The implementations set forth in the following exemplary embodiments do not represent all implementations consistent with the present disclosure. Instead, they are merely examples of apparatuses and methods consistent with aspects related to the present disclosure as recited in the appended claims.

Before data are transmitted between a base station and UE, the base station needs to configure an operating bandwidth for the UE. In the related art, the base station configures a fixed operating bandwidth for the UE. However, some UEs that access the base station may need relatively greater operating bandwidths, and some may need relatively smaller operating bandwidths. If the base station configures the same operating bandwidth for all the UEs, it will lead to a low bandwidth utilization ratio.

In the embodiments of the present disclosure, a base station obtains bandwidth capacity parameters of a UE, including a maximum operating bandwidth, a minimum operating bandwidth and a frequency band range that are supported by the UE. Bandwidth configuration information of the UE, including a carrier identifier, an operating bandwidth and an operating frequency of each of at least one carrier, is determined according to the bandwidth capacity parameters, and sent to the UE, such that the UE aggregates the at least one carrier into an operating carrier according to the bandwidth configuration parameters. As the base station can dynamically configure the operating bandwidth for the UE according to the bandwidth capacity parameters, the bandwidth in the base station can be reasonably configured. Thus, the bandwidth utilization ratio is increased.

Figure 1:
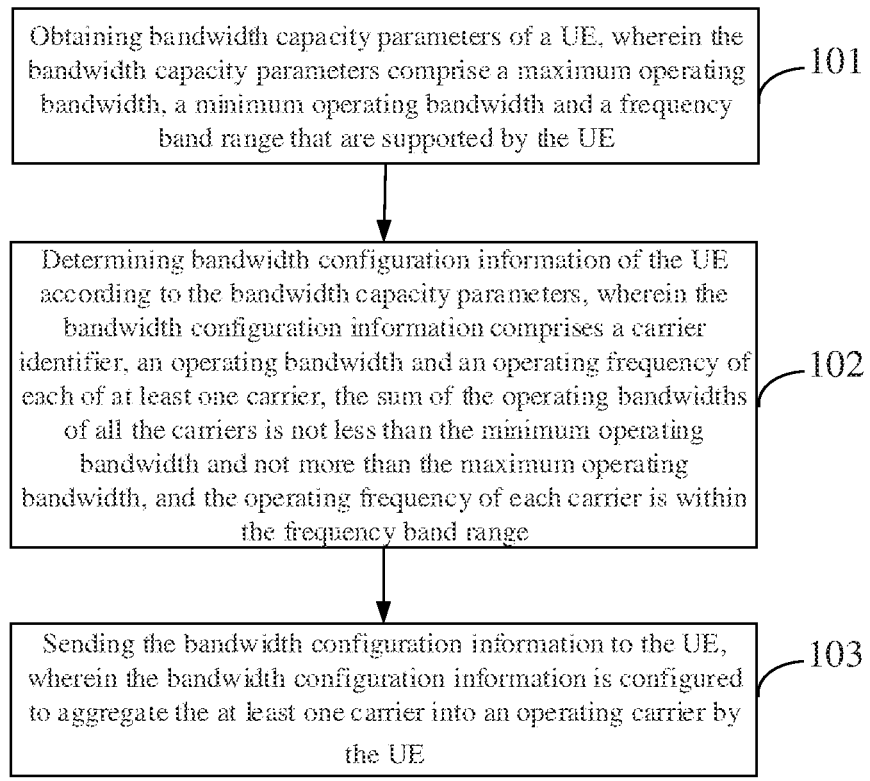
FIG. 1 is a flow chart of a method for configuring an operating bandwidth according to an exemplary embodiment.

FIG. 1 is a flow chart of a method for configuring an operating bandwidth according to an exemplary embodiment. The method is applied to a base station and includes the following steps as shown in FIG. 1.

In step 101, bandwidth capacity parameters of a UE, including a maximum operating bandwidth, a minimum operating bandwidth and a frequency band range that are supported by the UE, are obtained.

In step 102, bandwidth configuration information of the UE, including a carrier identifier, an operating bandwidth and an operating frequency of each of at least one carrier, is determined according to the bandwidth capacity parameters. The sum of the operating bandwidths of all the carriers is not less than the minimum operating bandwidth and not more than the maximum operating bandwidth. The operating frequency of each carrier is within the frequency band range.

In step 103, the bandwidth configuration information is sent to the UE and configured to aggregate at least one carrier into an operating carrier by the UE.

In a possible embodiment, prior to obtaining the bandwidth capacity parameters of the UE, the method further includes:

obtaining an amount of data to be transmitted corresponding to the UE and a current first operating bandwidth of the UE, determining a second operating bandwidth required by the UE according to the data amount, and if a difference between the first operating bandwidth and the second operating bandwidth is more than a preset threshold, performing the step of obtaining the bandwidth capacity parameters of the UE.

In a possible embodiment, obtaining the bandwidth capacity parameters of the UE includes:

receiving the bandwidth capacity parameters sent by the UE, or obtaining the bandwidth capacity parameters from subscription information of the UE.

In a possible embodiment, determining the bandwidth configuration information of the UE according to the bandwidth capacity parameters includes:

determining an adjusted bandwidth and a bandwidth adjustment type of the UE;

if the bandwidth adjustment type is a bandwidth increase and a current idle bandwidth in the base station is not less than the adjusted bandwidth, calculating the sum of the current first operating bandwidth and the adjusted bandwidth of the UE to obtain a third operating bandwidth, and determining, according to the frequency band range, at least one carrier of the base station, of which the operating frequency is within the frequency band range and the sum of the operating bandwidths is the third operating bandwidth;

if the bandwidth adjustment type is a bandwidth decrease, calculating a difference between the current first operating bandwidth and the adjusted bandwidth of the UE to obtain a fourth operating bandwidth, and determining, according to the frequency band range, at least one carrier of the base station, of which the frequency is within the frequency band range and the sum of the operating bandwidths is the fourth operating bandwidth; and forming the bandwidth configuration information by the carrier identifier, the operating bandwidth and the operating frequency of each of the at least one carrier.

In a possible embodiment, the determining the bandwidth configuration information of the UE according to the bandwidth capacity parameters includes:

determining a bandwidth adjustment type of the UE;

if the bandwidth adjustment type is the bandwidth increase and a current idle bandwidth in the base station is not less than a difference between the maximum operating bandwidth and the current first operating bandwidth of the UE, determining, according to the frequency band range, at least one carrier of the base station, of which the frequency is within the frequency band range and the sum of the operating bandwidths is the maximum operating bandwidth;

if the bandwidth adjustment type is the bandwidth decrease, determining, according to the frequency band range, at least one carrier of the base station, of which the frequency is within the frequency band range and the sum of the operating bandwidths is the minimum operating bandwidth; and forming the bandwidth configuration information by the carrier identifier, the operating bandwidth and the operating frequency of each of the at least one carrier.

All the above optional technical solutions may form optional embodiments of the present disclosure in their arbitrary combinations, and detailed description thereof will not repeated herein.

Figure 2:
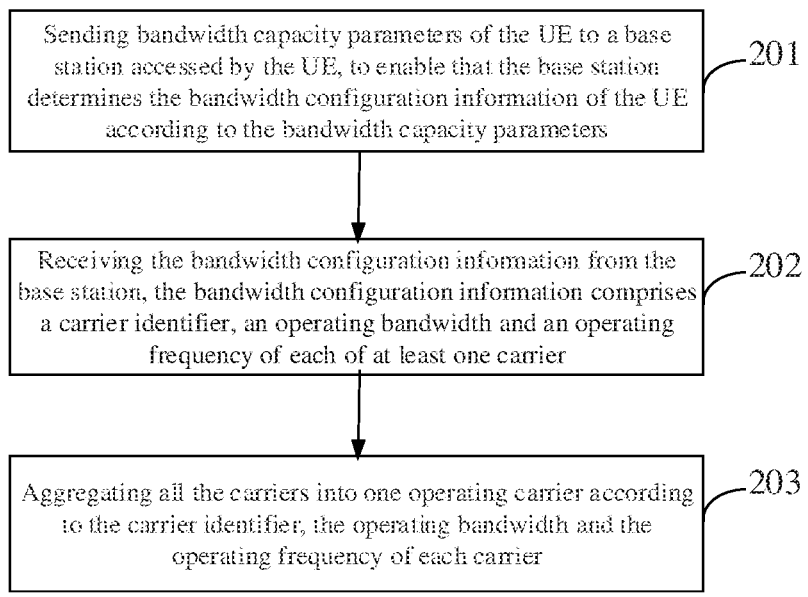
FIG. 2 is a flow chart of a method for configuring an operating bandwidth according to an exemplary embodiment.

FIG. 2 is a flow chart of a method for configuring an operating bandwidth according to an exemplary embodiment. The method is applied to a UE and includes the following steps as shown in FIG. 2:

step 201: sending bandwidth capacity parameters of the UE to a base station accessed by the UE to enable that the base station determines the bandwidth configuration information of the UE according to the bandwidth capacity parameters;

step 202: receiving the bandwidth configuration information from the base station, and forming the bandwidth configuration information by a carrier identifier, an operating bandwidth and an operating frequency of each of at least one carrier; and step 203: aggregating all the carriers into an operating carrier according to the carrier identifier, the operating bandwidth and the operating frequency of each carrier.

In a possible embodiment, prior to the sending the bandwidth capacity parameters of the UE to the base station accessed by the UE, the method further includes:

obtaining an amount of data to be transmitted corresponding to the UE and a current first operating bandwidth of the UE; and determining a second operating bandwidth required by the UE according to the data amount, and if a difference between the first operating bandwidth and the second operating bandwidth is more than a preset threshold, performing the step of sending the bandwidth capacity parameters of the UE to the base station accessed by the UE.

All the above optional technical solutions may form optional embodiments of the present disclosure in their arbitrary combinations, and detailed description thereof will not be repeated herein.

Figure 3:
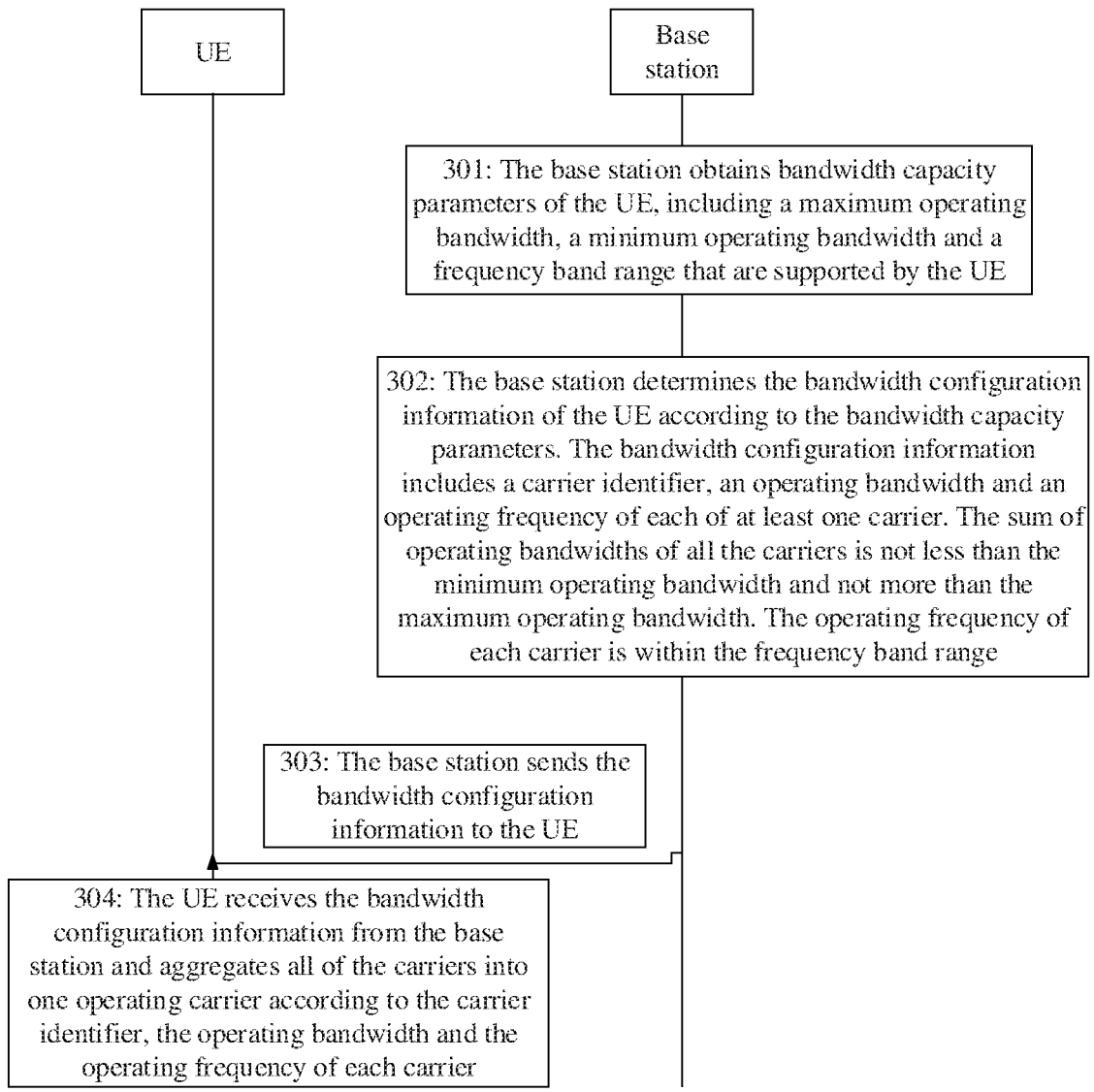
FIG. 3 is a flow chart of a method for configuring an operating bandwidth according to an exemplary embodiment.

FIG. 3 is a flow chart of a method for configuring an operating bandwidth according to an exemplary embodiment. The method is applied to a base station and UE, and includes the following steps as shown in FIG. 3.

In step 301, the base station obtains bandwidth capacity parameters of the UE, including a maximum operating bandwidth, a minimum operating bandwidth and a frequency band range that are supported by the UE.

In a possible embodiment, when data are transmitted between the base station and the UE, if the amount of the data to be transmitted corresponding to the UE is large, the UE requires a relatively broader operating bandwidth; and if the amount of the data to be transmitted corresponding to the UE is small, the UE requires a relatively narrower operating bandwidth. Thus, the base station determines whether the operating bandwidth of the UE needs to be adjusted or not according to the data amount before obtaining the bandwidth capacity parameters of the UE. If the operating bandwidth of the UE needs to be adjusted, the bandwidth capacity parameters of the UE are obtained from subscription information of the UE; and if the operating bandwidth of the UE does not need to be adjusted, it ends.

The step that the base station determines whether the operating bandwidth of the UE needs to be adjusted or not according to the data amount may be as below:

The base station obtains the data amount of the data to be transmitted corresponding to the UE and a current first operating bandwidth of the UE, and determines a second operating bandwidth required by the UE according to the data amount. If a difference between the first operating bandwidth and the second operating bandwidth is more than a preset threshold, the base station determines that the operating bandwidth of the UE needs to be adjusted. If the difference between the first operating bandwidth and the second operating bandwidth is not more than the preset threshold, the base station determines that the operating bandwidth of the UE does not need to be adjusted.

A corresponding relationship between a data amount range and the operating bandwidth is stored in the base station. Correspondingly, the step that the base station determines the second operating bandwidth required by the UE may be as below:

The base station determines the data amount range within which the data amount lies according to the data amount and obtains, according to the data amount range, the second operating bandwidth required by the UE from the corresponding relationship between the data amount range and the operating bandwidth.

During a downlink transmission that the base station transmits data to the UE, the base station obtains the data to be transmitted corresponding to the UE according to a device identifier of the UE. During an uplink transmission that the UE transmits data to the base station, the UE sends control information to the base station before transmitting the data to the base station. The control information carries the data amount. The base station receives the control information sent by the UE and obtains the data amount from the control information.

In a possible embodiment, to improve the speed of data transmission between a UE and base station, the UE detects whether it supports broad operating bandwidth when accessing the base station. If yes, the UE sends the bandwidth capacity parameters to the base station and the base station receives the bandwidth capacity parameters sent by the UE.

For example, the minimum operating bandwidth supported by the UE is 80 MHz. The maximum operating bandwidth supported by the UE is 1 GHz. An operating frequency band is 9.9-86 GHz. Then, the UE sends its bandwidth capacity parameters to the base station when accessing the base station, and the bandwidth capacity parameters include 80 MHz, 1 GHz and 9.9-86 GHz, such that the base station may configure a relatively wider operating bandwidth for the UE.

In a possible embodiment, when data are transmitted between a UE and base station, the UE determines whether its operating bandwidth needs to be adjusted or not according to the data amount of the data to be transmitted corresponding to the UE. If the operating bandwidth of the UE needs to be adjusted, the UE sends the bandwidth capacity parameters to the base station.

In an embodiment of the present disclosure, the UE sends the bandwidth capacity parameters to the base station through an Radio Resource Control (RRC) instruction.

The UE may be any UE that accesses the base station, for example, a 5G UE that accesses the base station.

In step 302, the base station determines the bandwidth configuration information of the UE according to the bandwidth capacity parameters. The bandwidth configuration information includes a carrier identifier, an operating bandwidth and an operating frequency of each of at least one carrier. The sum of operating bandwidths of all the carriers is not less than the minimum operating bandwidth and not more than the maximum operating bandwidth. The operating frequency of each carrier is within the frequency band range.

In a first implementation mode as follows, the base station may set an adjusted bandwidth for the UE, and every time, an adjusted bandwidth is made to the current first operating bandwidth of the UE. In a second implementation mode as follows, the base station may otherwise directly adjust the current operating bandwidth of the UE as the maximum operating bandwidth or the minimum operating bandwidth according to the maximum operating bandwidth or the minimum operating bandwidth.

The first implementation mode, it can be realized by the following steps (1)-(4).

(1) The base station may determine an adjusted bandwidth and a bandwidth adjustment type of the UE.

In a possible embodiment, the bandwidth configuration information of the UE includes the adjusted bandwidth of the UE, and the base station obtains the adjusted bandwidth of the UE from the bandwidth configuration information of the UE.

Alternatively, the adjusted bandwidths of all the UEs that access the base station are stored in the base station. Correspondingly, the step that the base station determines the adjusted bandwidth of the UE may be that: the base station obtains the adjusted bandwidth of the UE from a corresponding relationship between the device identifier and the adjusted bandwidth according to the device identifier of the UE.

Alternatively, a corresponding relationship between the data amount range and the adjusted bandwidth is stored in the base station. Correspondingly, the step that the base station determines the adjusted bandwidth of the UE may be that: the base station determines the data amount range within which the data amount is located according to the data amount and obtains, according to the data amount range, the adjusted bandwidth of the UE from the corresponding relationship between the data amount range and the adjusted bandwidth.

In a possible embodiment, the UE sends its adjusted bandwidth to the base station before or after sending the bandwidth capacity parameters to the base station. Alternatively, the base station determines the bandwidth adjustment type according to the first operating bandwidth and the second operating bandwidth.

The step that the base station determines the bandwidth adjustment type according to the first operating bandwidth and the second operating bandwidth may be as below:

If the first operating bandwidth is greater than the second operating bandwidth, the base station determines that the bandwidth adjustment type of the UE is a bandwidth decrease; and if the first operating bandwidth is smaller than the second operating bandwidth, the base station determines that the bandwidth adjustment type of the UE is a bandwidth increase.

(2) If the bandwidth adjustment type is a bandwidth increase and a current idle bandwidth in the base station is not less than the adjusted bandwidth, the base station calculates the sum of the current first operating bandwidth and the adjusted bandwidth of the UE to obtain a third operating bandwidth. The base station determines, according to the frequency band range, at least one carrier of the base station, of which the operating frequency is within the frequency band range and the sum of the operating bandwidths is the third operating bandwidth.

One carrier of the base station corresponds to one operating frequency and one operating bandwidth. Correspondingly, the step that the base station determines, according to the frequency band range, the at least one carrier of the base station, of which the operating frequency is within the frequency band range and the sum of the operating bandwidths is the third operating bandwidth may be as below:

The base station determines carriers in the base station, which have operating frequencies that are within the frequency band range and are in an idle state, and forms them into a first carrier set, according to the frequency band range. At least one carrier of which the sum of the operating bandwidths is the third operating bandwidth is selected from the first carrier set according to the third operating bandwidth. The operating frequency of the at least one carrier may be continuous or separated.

In a possible embodiment, the base station has already configured an operating bandwidth for the UE. In this step, the base station only increases the bandwidth of the UE. Then, after determining the at least one carrier, the base station obtains a second carrier set allocated for the UE. The carrier(s) in the second carrier set are removed from the at least one carrier.

In a possible embodiment, the base station has already configured an operating bandwidth for the UE. The bandwidth which was already configured for the UE is maintained but an additional bandwidth is added. Then, this step may be replaced as:

the base station determines, according to the frequency band range, at least one carrier of the base station, of which the operating frequency is within the frequency band range and the sum of the operating bandwidths is the adjusted bandwidth.

In the cases that an idle bandwidth exists in the base station, the bandwidth of the UE could be increased. Thus, the base station determines whether the current idle bandwidth in the base station is less than the adjusted bandwidth first. If the current idle bandwidth is not less than the adjusted bandwidth, the base station determines that an increase of the bandwidth of the UE is permitted. At this time, the base station calculates the sum of the current first operating bandwidth and the adjusted bandwidth of the UE to obtain the third operating bandwidth.

Since the third operating bandwidth could not exceed the maximum operating bandwidth supported by the UE, the base station obtains the sum of the third operating bandwidth by calculation, and determines whether the third operating bandwidth is not more than the maximum operating bandwidth. If the third operating bandwidth is not more than the maximum bandwidth, the base station performs the step of determining, according to the frequency band range, at least one carrier of the base station, of which the operating frequency is within the frequency band range and the sum of the operating bandwidths is the third operating bandwidth. If the third operating bandwidth is greater than the maximum operating bandwidth, it ends.

In a possible embodiment, when the base station determines the at least one carrier, if there are carriers having continuous operating frequencies, then these carriers are preferable.

(3) If the bandwidth adjustment type is a bandwidth decrease, the base station calculates a difference between the current first operating bandwidth and the adjusted bandwidth of the UE to obtain a fourth operating bandwidth and determines, according to the frequency hand range, at least one carrier of the base station, of which the frequency is within the frequency range and the sum of the operating bandwidths is the fourth operating bandwidth.

In a possible embodiment, the base station has already configured an operating bandwidth for the UE. In this step, the base station only reduces the bandwidth for the UE. The step can be replaced as below:

The base station obtains the second carrier set allocated for the UE and determines at least one carrier in the second carrier set, of which the sum of the operating bandwidths is the decreased bandwidth.

(4) The base station forms the carrier identifier, operating bandwidth and operating frequency of each of the at least one carrier into the bandwidth configuration information.

In a possible embodiment, the base station may also add a carrier type and/or carrier configuration information of each carrier to the bandwidth configuration information. The carrier identifier of the carrier may be a serial number, an operating frequency or the like of the carrier.

The carrier type may be TDD (Time Division Duplex) or FDD (Frequency Division Duplex). The carrier configuration information may be a port number of an antenna corresponding to the carrier or the like.

The second implementation mode can be realized by the following steps (A)-(D).

(A) The base station determines the bandwidth adjustment type of the UE.

The step in which the base station determines the bandwidth adjustment type of the UE is the same as the step (1), and therefore, will not be repeated herein.

(B) If the bandwidth adjustment type is a bandwidth increase and the current idle bandwidth in the base station is not less than a difference between the maximum operating bandwidth and the current first operating bandwidth of the UE, the base station determines, according to the frequency band range, at least one carrier of the base station, of which the frequency is within the frequency band range and the sum of the operating bandwidths is the maximum operating bandwidth.

In a possible embodiment, the base station calculates the difference between the maximum operating bandwidth and the first operating bandwidth to obtain a fifth operating bandwidth, and determines, according to the frequency band range, at least one carrier of the base station, of which the frequency is within the frequency band range and the sum of the operating bandwidths is the fifth operating bandwidth.

(C) If the bandwidth adjustment type is a bandwidth decrease, the base station determines, according to the frequency band range, at least one carrier of the base station, of which the frequency is within the frequency band range and the sum of the operating bandwidths is the minimum operating bandwidth.

In a possible embodiment, the base station obtains the second carrier set which is already allocated for the UE, and determines at least one carrier in the second carrier set, of which the frequency is within the frequency band range and the sum of the operating bandwidths is the minimum operating bandwidth.

(D) The base station forms the carrier identifier, operating bandwidth and operating frequency of each of the at least one carrier into the bandwidth configuration information.

In step S303, the base station sends the bandwidth configuration information to the UE.

The base station sends the bandwidth configuration information to the UE through a unicast RRC instruction. The bandwidth configuration information includes the carrier identifier, the operating bandwidth and the operating frequency of each carrier and may be further based on the carrier type and/or the carrier configuration information, etc.

In step S304, the UE receives the bandwidth configuration information from the base station and aggregates all of the carriers into one operating carrier according to the carrier identifier, the operating bandwidth and the operating frequency of each carrier.

The UE activates each carrier according to the carrier identifier, the operating bandwidth and the operating frequency of each carrier, and then, aggregates all of the activated carriers into a continuous operating carrier.

In the embodiments of the present disclosure, the base station obtains the bandwidth capacity parameters of the UE, including the maximum operating bandwidth, the minimum operating bandwidth and the frequency band range that are supported by the UE. The bandwidth configuration information of the UE, including the carrier identifier, the operating bandwidth and the operating frequency of each of the at least one carrier, is determined according to the bandwidth capacity parameters, and sent to the UE, such that the UE aggregates the at least one carrier into the operating carrier according to the bandwidth configuration information. As the base station could dynamically configure the operating bandwidth for the UE according to the bandwidth capacity parameters, the bandwidths in the base station could be reasonably configured. Thus, the bandwidth utilization ratio is increased.

Figure 4:
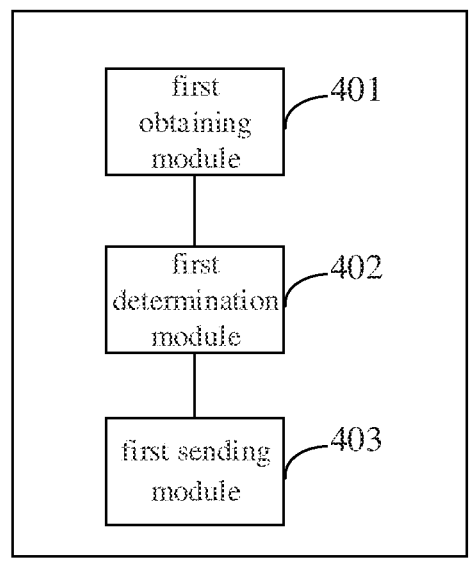
FIG. 4 is a block diagram of a device for configuring an operating bandwidth according to an exemplary embodiment.

FIG. 4 is a block diagram of a device for configuring an operating bandwidth according to an exemplary embodiment. Referring to FIG. 4, the device comprises:

a first obtaining module 401 configured to obtain bandwidth capacity parameters of a UE, wherein the bandwidth capacity parameters comprise a maximum operating bandwidth, a minimum operating bandwidth and a frequency band range that are supported by the UE;

a first determination module 402 configured to determine bandwidth configuration information of the UE according to the bandwidth capacity parameters, wherein the bandwidth configuration information comprises a carrier identifier, an operating bandwidth and an operating frequency of each of at least one carrier, the sum of the operating bandwidths of all the carriers is not less than the minimum operating bandwidth and not more than the maximum operating bandwidth, and the operating frequency of each carrier is within the frequency band range; and a first sending module 403 configured to send the bandwidth configuration information to the UE, wherein the bandwidth configuration information is configured to aggregate the at least one carrier into an operating carrier by the UE.

Figure 5:
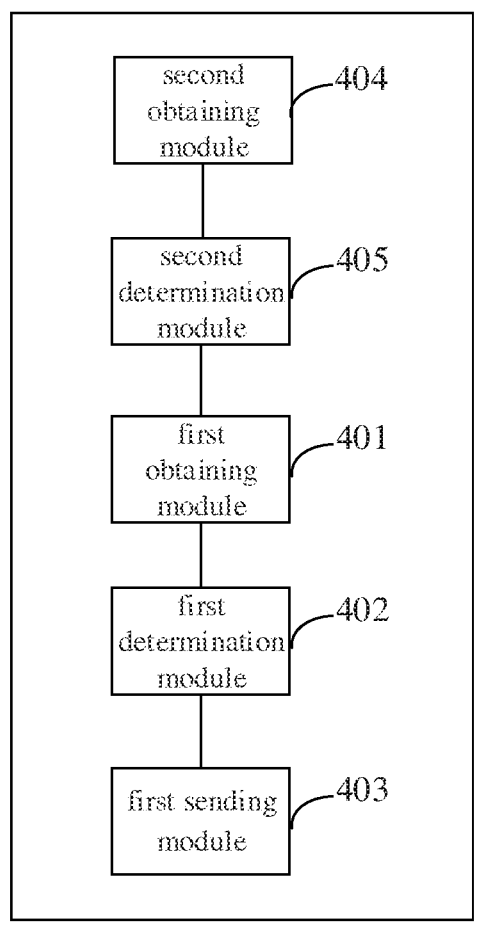
FIG. 5 is a block diagram of a device for configuring an operating bandwidth according to an exemplary embodiment.

In a possible embodiment, referring to FIG. 5, the device further comprises:

a second obtaining module 404 configured to obtain an amount of data to be transmitted corresponding to the UE and a current first operating bandwidth of the UE; and a second determination module 405 configured to determine a second operating bandwidth required by the UE according to die data amount, wherein the first obtaining module 401 is configured to obtain the bandwidth capacity parameters of the UE if a difference between the first operating bandwidth and the second operating bandwidth is more than a preset threshold.

In a possible embodiment, the first obtaining module 401 is further configured to receive the bandwidth capacity parameters sent by the UE; or the first obtaining module 401 is further configured to obtain the bandwidth capacity parameters from subscription information of the UE.

Figure 6:
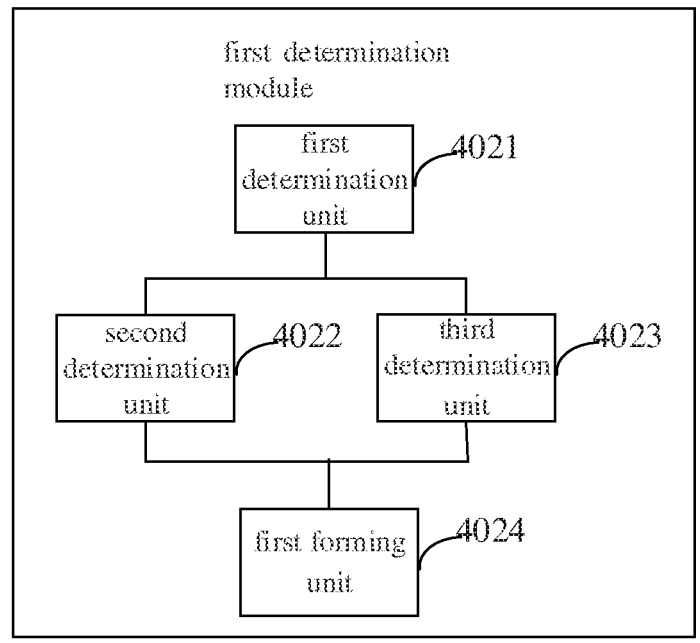
FIG. 6 is a block diagram of a first determination module according to an exemplary embodiment.

In a possible embodiment, referring to FIG. 6, the first determination module 402 comprises:

a first determination unit 4021 configured to determine an adjusted bandwidth and a bandwidth adjustment type of the UE;

a second determination unit 4022 configured to calculate the sum of the current first operating bandwidth and the adjusted bandwidth of the UE to obtain a third operating bandwidth and to determine, according to the frequency band range, at least one carrier of the base station, of which the operating frequency is within the frequency band range and the sum of die operating bandwidths is the third operating bandwidth, if the bandwidth adjustment type is a bandwidth increase and a current idle bandwidth in the base station is not less than the adjusted bandwidth;

a third determination unit 4023 configured to calculate a difference between the current first operating bandwidth and the adjusted bandwidth of the UE to obtain a fourth operating bandwidth, and to determine, according to the frequency band range, at least one carrier of the base station, of which the frequency is within the frequency band range and the sum of the operating bandwidths is the fourth operating bandwidth, if the bandwidth adjustment type is a bandwidth decrease; and a first forming unit 4024 configured to form the bandwidth configuration information by the carrier identifier, the operating bandwidth and the operating frequency of each of the at least one carrier.

Figure 7:
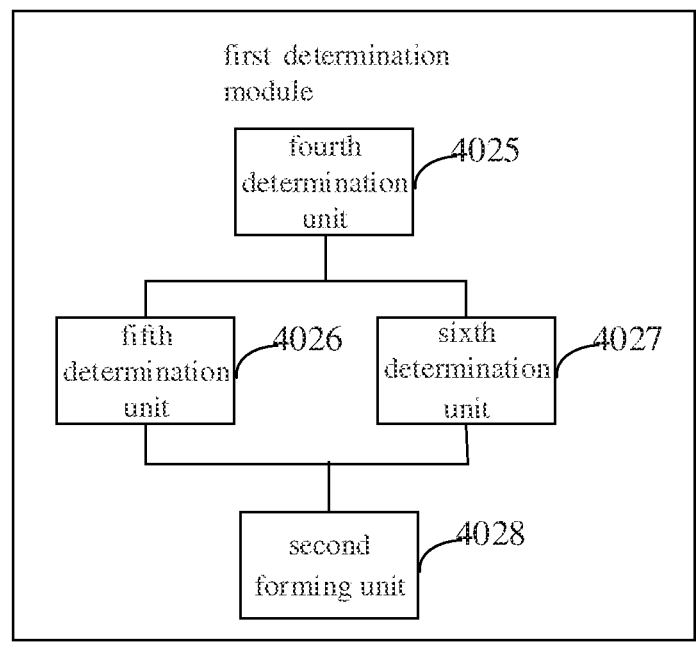
FIG. 7 is a block diagram of a first determination module according to an exemplary embodiment.

In a possible embodiment, referring to FIG. 7, the first determination module 402 comprises:

a fourth determination unit 4025 configured to determine a bandwidth adjustment type of the UE;

a fifth determination unit 4026 configured to determine, according to the frequency band range, at least one carrier of the base station, of which the frequency is within the frequency band range and the sum of the operating bandwidths is the maximum operating bandwidth, if the bandwidth adjustment type is a bandwidth increase and a current idle bandwidth in the base station is not less than a difference between the maximum operating bandwidth and the current first operating bandwidth of the UE;

a sixth determination unit 4027 configured to determine, according to the frequency band range, at least one carrier of the base station, of which the frequency is within the frequency band range and the sum of the operating bandwidths is the minimum operating bandwidth, if the bandwidth adjustment type is a bandwidth decrease; and a second forming unit 4028 configured to form the bandwidth configuration information by the carrier identifier, the operating bandwidth and the operating frequency of each of the at least one carrier.

In the embodiment of the present disclosure, the base station obtains the bandwidth capacity parameters of the UE, including the maximum operating bandwidth, the minimum operating bandwidth and the frequency band range that are supported by the UE. The bandwidth configuration information of the UE, including the carrier identifier, the operating bandwidth and the operating frequency of each of the at least one carrier, is determined according to the bandwidth capacity parameters, and sent to the UE, such that the UE aggregates the at least one carrier into the operating carrier according to the bandwidth configuration information. As the base station could dynamically configure the operating bandwidth for the UE according to the bandwidth capacity parameters, the bandwidth in the base station can be reasonably configured. Thus, the bandwidth utilization ratio is increased.

Figure 8:
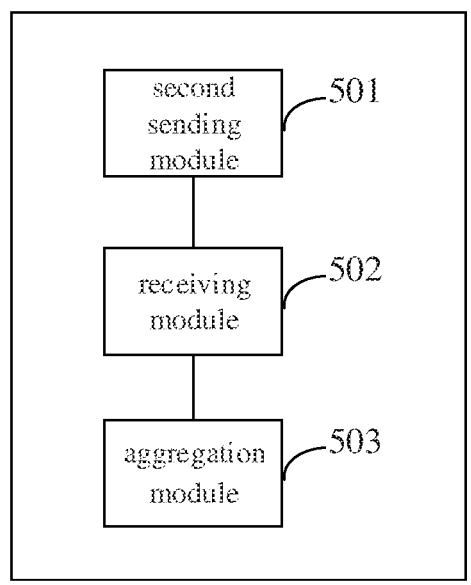
FIG. 8 is a block diagram of a device for configuring an operating bandwidth according to an exemplary embodiment.

FIG. 8 is a block diagram of a device for configuring an operating bandwidth according to an exemplary embodiment. Referring to FIG. 8, 13, the device comprises:

a second sending module 501 configured to send bandwidth capacity parameters of a UE to a base station accessed by the UE, to enable that the base station determines the bandwidth configuration information of the UE according to the bandwidth capacity parameters;

a receiving module 502 configured to receive the bandwidth configuration information from the base station, and to form the bandwidth configuration information by a carrier identifier, an operating bandwidth and an operating frequency of each of at least one carrier; and an aggregation module 503 configured to aggregate all the carriers into one operating carrier according to the carrier identifier, the operating bandwidth and the operating frequency of each carrier.

Figure 9:
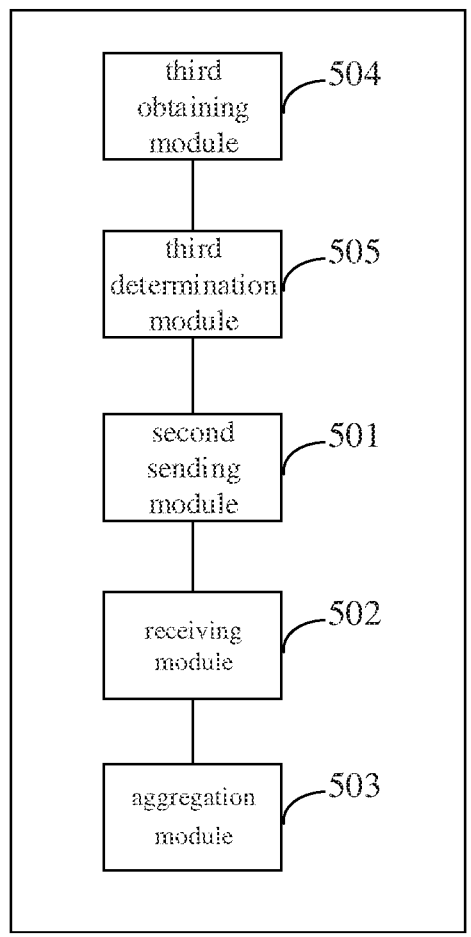
FIG. 9 is a block diagram of a device for configuring an operating bandwidth according to an exemplary embodiment.

In a possible embodiment, referring to FIG. 9, the device further comprises:

a third obtaining module 504 configured to obtain an amount of data to be transmitted corresponding to the UE and a current first operating bandwidth of the UE; and a third determination module 505 configured to determine a second operating bandwidth required by the UE according to the data amount, and the second sending module 501 is configured to send the bandwidth capacity parameters of the UE to the base station accessed by the UE if a difference between the first operating bandwidth and the second operating bandwidth is more than a preset threshold.

In the embodiment of the present disclosure, the base station obtains the bandwidth capacity parameters of the UE, including the maximum operating bandwidth, the minimum operating bandwidth and the frequency band range that are supported by the UE. The bandwidth configuration information of the UE, including the carrier identifier, the operating bandwidth and the operating frequency of each of the at least one carrier, is determined according to the bandwidth capacity parameters, and sent to the UE, such that the UE aggregates the at least one carrier into the operating carrier according to the bandwidth configuration information. As the base station could dynamically configure the operating bandwidth for the UE according to the bandwidth capacity parameters, the bandwidth in the base station can be reasonably configured. Thus, the bandwidth utilization ratio is increased.

With regard to the devices in the above embodiments, the specific manners in which each module performs operations have already been described in detail in the method-relevant embodiments, and therefore, will not be illustrated in detail herein.

Figure 10:
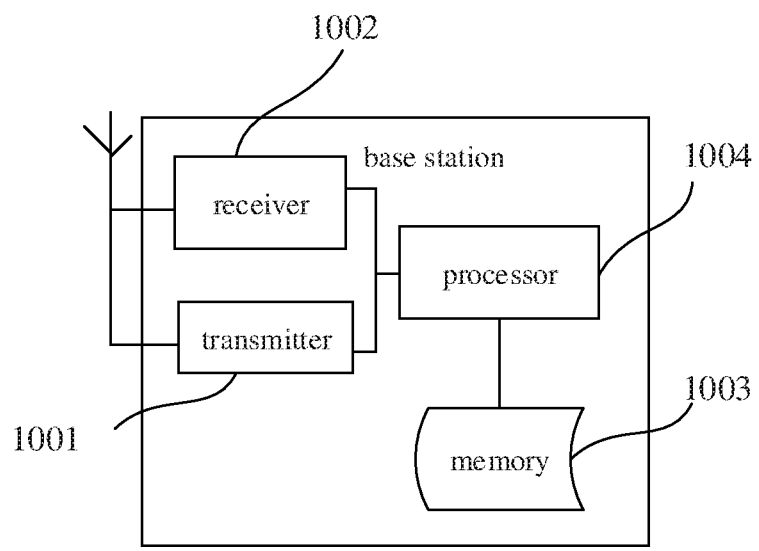
FIG. 10 is a structural schematic view of a base station according to an exemplary embodiment.

FIG. 10 is a structural schematic view of a base station according to an exemplary embodiment. As shown in FIG. 10, the base station includes a transmitter 1001, a receiver 1002, a memory 1003 and a processor 1004 connected to the transmitter, the receiver and the memory, respectively. Certainly, the base station may further include universal parts, e.g., an antenna, a baseband processing part, an intermediate radio frequency processing part and an I/O (Input/Output) device, which are not limited in the embodiments of the present disclosure. The processor 1004 is configured to perform the base-station-side method in any optional implementation mode provided by the foregoing embodiments.

Figure 11:
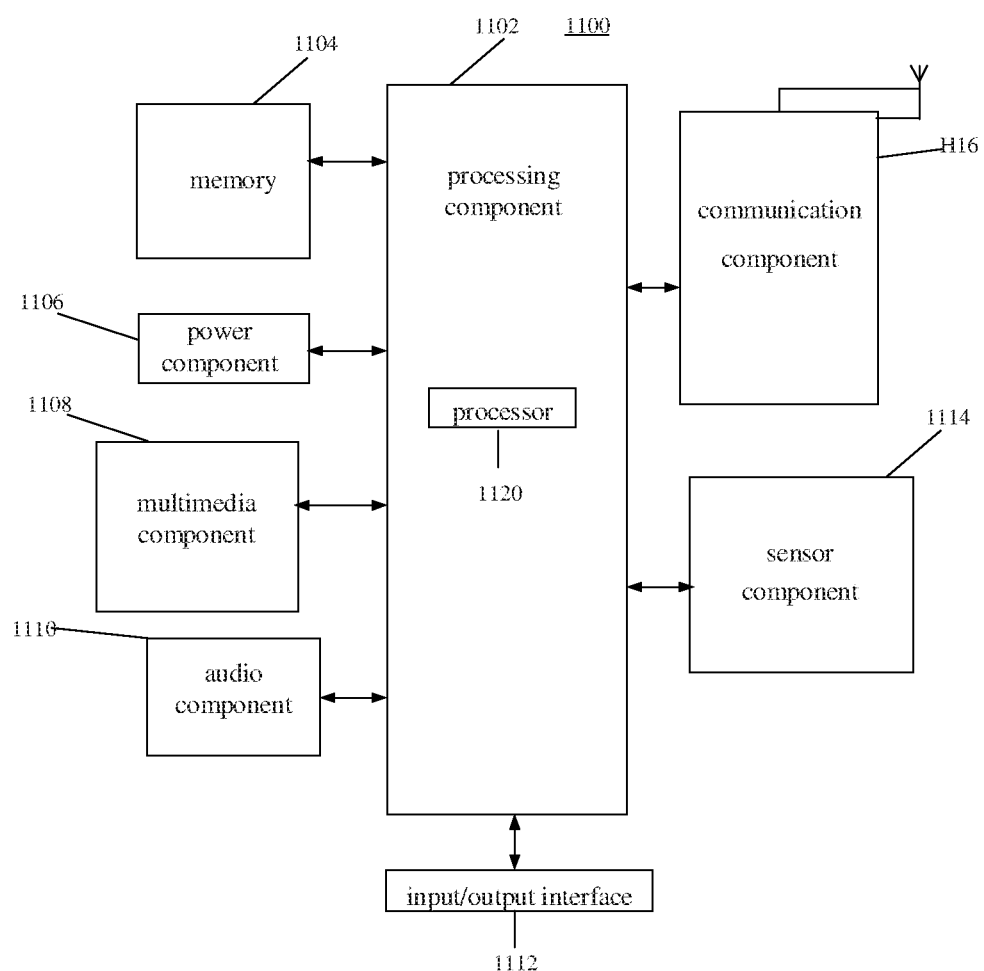
FIG. 11 is a structural schematic view of a UE according to an exemplary embodiment.

FIG. 11 is a structural schematic view of a UE according to an exemplary embodiment. For example, the UE1100 may be be a mobile phone, a computer, a digital broadcast terminal, a messaging device, a gaining console, a tablet, a medical device, an exercise equipment, a personal digital assistant, and the like.

Referring to FIG. 11, the UE 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the UE1100, such as the operations associated with display, telephone calls, data communications, camera operations, and recording operations. The processing component 1102 may include one or more processors 1120 to execute instructions to perform all or part of the steps in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the UE1100. Examples of such data include instructions for any applications or methods operated on the UE1100, contact data, phonebook data, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power for various components of the UE1100. The power component 1106 may include a power management system, one or more power sources, and any other components associated with the generation, management, and distribution of power in the UE1100.

The multimedia component 1108 includes a screen providing an output interface between the UE1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1108 includes a front camera and/or a rear camera. The front camera and/or the rear camera may receive an external multimedia datum while the UE1100 is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 includes a microphone ("MIC") configured to receive an external audio signals when the UE1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a start button, and a lock button.

The sensor component 1114 includes one or more sensors to provide status assessments for various aspects of the UE1100. For instance, the sensor component 1114 may detect an on/off status of the UE1100, relative positioning of components, e.g., the display device and the mini keyboard, of the device 1100, a position change of the UE1100 or a component of the UE1100, a presence or absence of user contact with the UE1100, an orientation or an acceleration/deceleration of the UE1100, and temperature change of the UE1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wireless, between the UE1100 and other devices. The UE1100 can access a wireless network based on a communication standard, such as WiFi, 2G, or 3G, or a combination thereof. In one exemplary embodiment, the communication component 1116 receives a broadcast signal or broadcast associated information from an external broadcast management system via a broadcast channel. In one exemplary embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the UE1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods for configuring an operating bandwidth.

In exemplary embodiments, there is also provided a non-transitory computer-readable storage medium including instructions, such as a memory 1104 including instructions, and the instructions may be executable by the processor 1120 of the UE1100, for performing the above-described methods. For example, the non-transitory computer-readable storage medium may be a ROM, a RAM, a CD-ROM, a magnetic tape, a floppy disc, an optical data storage device, and the like.

In exemplary embodiments, there is further provided a non-transitory computer-readable storage medium comprising instructions stored therein that, when executed by the processor of the UE, cause the UE to perform the method for configuring an operating bandwidth.

In the examples of the present disclosure, the base station adjusts the operating bandwidth of the UE according to the amount of the data to be transmitted corresponding to the UE, thereby improving not only the bandwidth utilization but also the data transmission rate.

In the examples of the present disclosure, the base station may obtain the bandwidth capability parameter sent by the UE, or obtain the bandwidth capability parameter from the subscription information of the UE, which extends the manners of obtaining the bandwidth capability parameter, thereby enriching the applicable scenario.

In the examples of the present disclosure, the base station may adjust the current operating bandwidth of the UE by using a fixed adjusted bandwidth, thereby achieving reasonable allocation of bandwidths in the base station and improving the bandwidth utilization ratio.

In the examples of the present disclosure, if the bandwidth adjustment type is a bandwidth increase and there is enough current idle bandwidth in the base station, the base station may directly adjust the operating bandwidth of the UE to the maximum operating bandwidth supported by the UE, which could improve the adjust efficiency and thereby improve the data transmission efficiency.

If the bandwidth adjustment type is a bandwidth decrease, the base station may directly adjust the operating bandwidth of the UE to the minimum working bandwidth supported by the UE, which may improve the adjustment efficiency. As such, the base station could free up more idle bandwidth for subsequent allocation to other UEs, which improves the bandwidth utilization ratio.

In the examples of the present disclosure, the base station can dynamically configure the operating bandwidth for the UE according to the bandwidth capability parameter of the UE, so that the bandwidth in the base station can be reasonably configured. Thus, the bandwidth utilization ratio is increased.

In the examples of the present disclosure, the UE adjusts the operating bandwidth of the UE according to the amount of the data to be transmitted corresponding to the UE, thereby improving not only the bandwidth utilization ratio but also the data transmission rate.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical means which are not disclosed herein. The specification and embodiments are to be considered as exemplary only, with a true scope and spirit of the present disclosure indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method applied to a base station for configuring an operating bandwidth, comprising:
   obtaining an amount of data to be transmitted corresponding to user equipment (UE) and a current first operating bandwidth of the UE;
   determining, according to the amount of data, a range of the amount of data within which the amount of data lies;
   obtaining, according to the range of the amount of data, a second operating bandwidth required by the UE from a corresponding relationship between the range of the amount of data and the second operating bandwidth;
   obtaining, if a difference between the first operating bandwidth and the second operating bandwidth is greater than a preset threshold, bandwidth capacity parameters of the UE, wherein the bandwidth capacity parameters comprise a maximum operating bandwidth, a minimum operating bandwidth and a frequency band range that are supported by the UE;
   determining bandwidth configuration information of the UE according to the bandwidth capacity parameters, wherein the bandwidth configuration information comprises a carrier identifier, an operating bandwidth and an operating frequency of each of at least one carrier, a sum of the operating bandwidths of all the carriers is not less than the minimum operating bandwidth and not more than the maximum operating bandwidth, and the operating frequency of each carrier is within the frequency band range; and
   sending the bandwidth configuration information to the UE, wherein the bandwidth configuration information is configured to aggregate the at least one carrier into an operating carrier by the UE.

2. The method according to claim 1, wherein the obtaining bandwidth capacity parameters of UE comprises:
   receiving the bandwidth capacity parameters sent by the UE.

3. The method according to claim 1, wherein the determining bandwidth configuration information of the UE according to the bandwidth capacity parameters comprises:
   determining an adjusted bandwidth and a bandwidth adjustment type of the UE;
   if the bandwidth adjustment type is a bandwidth increase and a current idle bandwidth in the base station is not less than the adjusted bandwidth, calculating a sum of the current first operating bandwidth and the adjusted bandwidth of the UE to obtain a third operating bandwidth, and determining; according to the frequency band range, at least one carrier of the base station, of which the operating frequency is within the frequency band range and a sum of the operating bandwidths is the third operating bandwidth;
   if the bandwidth adjustment type is a bandwidth decrease, calculating a difference between the current first operating bandwidth and the adjusted bandwidth of the UE to obtain a fourth operating bandwidth, and determining, according to the frequency band range, at least one carrier of the base station, of which the frequency is within the frequency band range and the sum of the operating bandwidths is the fourth operating bandwidth; and
   forming the bandwidth configuration information by the carrier identifier, the operating bandwidth and the operating frequency of each of the at least one carrier.

4. The method according to claim 1, wherein the determining bandwidth configuration information of the UE according to the bandwidth capacity parameters comprises:
   determining a bandwidth adjustment type of the UE;
   if the bandwidth adjustment type is a bandwidth increase and a current idle bandwidth in the base station is not less than a difference between the maximum operating bandwidth and the current first operating bandwidth of the UE, determining, according to the frequency band range, at least one carrier of the base station, of which the frequency is within the frequency band range and a sum of the operating bandwidths is the maximum operating bandwidth;
   if the bandwidth adjustment type is a bandwidth decrease, determining, according to the frequency band range, at least one carrier of the base station, of which the frequency is within the frequency band range and the sum of the operating bandwidths is the minimum operating bandwidth; and forming the bandwidth configuration information by the carrier identifier, the operating bandwidth and the operating frequency of each of the at least one carrier.

5. A device for configuring an operating bandwidth, comprising:
a processor; and
a memory storing instructions executable by the processor,
wherein the processor is configured to:
obtain an amount of data to be transmitted corresponding to user equipment (UE) and a current first operating bandwidth of the UE;
determine, according to the amount of data, a range of the amount of data within which the amount of data lies;
obtain, according to the range of the amount of data, a second operating bandwidth required by the UE from a corresponding relationship between the range of the amount of data and the second operating bandwidth determine a second operating bandwidth required by the UE according to the amount of data;
obtain, if a difference between the first operating bandwidth and the second operating bandwidth is greater than a preset threshold, bandwidth capacity parameters of the UE, wherein the bandwidth capacity parameters comprise a maximum operating bandwidth, a minimum operating bandwidth and a frequency band range that are supported by the UE;
determine bandwidth configuration information of the UE according to the bandwidth capacity parameters, wherein the bandwidth configuration information comprises a carrier identifier; an operating bandwidth and an operating frequency of each of at least one carrier, a sum of the operating bandwidths of all the carriers is not less than the minimum operating bandwidth and not more than the maximum operating bandwidth, and the operating frequency of each carrier is within the frequency band range; and
send the bandwidth configuration information to the UE, wherein the bandwidth configuration information is configured to aggregate the at least one carrier into an operating carrier by the UE.

6. The device according to claim 5, wherein the processor is further configured to receive the bandwidth capacity parameters sent by the UE.

7. The device according to claim 5, wherein the processor is further configured to:
determine an adjusted bandwidth and a bandwidth adjustment type of the UE;
calculate a sum of the current first operating bandwidth and the adjusted bandwidth of the UE to obtain a third operating bandwidth and to determine, according to the frequency band range, at least one carrier of the base station, of which the operating frequency is within the frequency band range and a sum of the operating bandwidths is the third operating bandwidth, if the bandwidth adjustment type is a bandwidth increase and a current idle bandwidth in the base station is not less than the adjusted bandwidth;
calculate a difference between the current first operating bandwidth and the adjusted bandwidth of the UE to obtain a fourth operating bandwidth, and determine, according to the frequency band range, at least one carrier of the base station, of which the frequency is within the frequency band range and the sum of the operating bandwidths is the fourth operating bandwidth, if the bandwidth adjustment type is a bandwidth decrease; and form the bandwidth configuration information by the carrier identifier, the operating bandwidth and the operating frequency of each of the at least one carrier.

8. The device according to claim 5, wherein the processor is further configured to:
determine a bandwidth adjustment type of the UE;
determine, according to the frequency band range, at least one carrier of the base station, of which the frequency is within the frequency band range and a sum of the operating bandwidths is the maximum operating bandwidth, if the bandwidth adjustment type is a bandwidth increase and a current idle bandwidth in the base station is not less than a difference between the maximum operating bandwidth and the current first operating bandwidth of the UE;
determine, according to the frequency band range, at least one carrier of the base station, of which the frequency is within the frequency band range and the sum of the operating bandwidths is the minimum operating bandwidth, if the bandwidth adjustment type is the bandwidth decrease; and
form the bandwidth configuration information by the carrier identifier, the operating bandwidth and the operating frequency of each of the at least one carrier.

9. A device for configuring an operating bandwidth, comprising:
a processor; and
a memory storing instructions executable by the processor,
wherein the processor is configured to:
obtain an amount of data to be transmitted corresponding to user equipment (UE) and a current first operating bandwidth of the UE;
determine, according to the amount of data, a range of the amount of data within which the amount of data lies;
obtain, according to the range of the amount of data, a second operating bandwidth required by the UE from a corresponding relationship between the range of the amount of data and the second operating bandwidth;
send, if a difference between the first operating bandwidth and the second operating bandwidth is greater than a preset threshold, bandwidth capacity parameters of the UE to a base station accessed by the UE, to enable that the base station determines the bandwidth configuration information of the UE according to the bandwidth capacity parameters;
receive the bandwidth configuration information from the base station, the bandwidth configuration information including a carrier identifier, an operating bandwidth and an operating frequency of each of at least one carrier; and
aggregate all the carriers into an operating carrier according to the carrier identifier, the operating bandwidth and the operating frequency of each carrier.

10. The method according to claim 1, wherein the obtaining bandwidth capacity parameters of UE comprises;
obtaining the bandwidth capacity parameters from subscription information of the UE.

11. The device according to claim 5, wherein the processor is further configured to obtain the bandwidth capacity parameters from subscription information of the UE.

12. The method according to claim 3, wherein determining, according to the frequency band range, at least one carrier of the base station, of which the operating frequency is within the frequency band range and the sum of the operating bandwidths is the third operating bandwidth comprises:

determining one or more carriers in the base station, which have operating frequencies that are within the frequency band range and are in an idle state;

forming a first carrier set using the one or more carriers, according to the frequency band range; and selecting from the first carrier set, according to the third operating bandwidth, at least one carrier of which the sum of the operating bandwidths is the third operating bandwidth.

13. The method according to claim 3, wherein determining the adjusted bandwidth of the UE comprises:

obtaining, according to a device identifier of the UE, the adjusted bandwidth of the UE from a corresponding relationship between the device identifier and the adjusted bandwidth.

14. The method according to claim 3, wherein determining the adjusted bandwidth of the UE comprises:

determining, according to the amount of data, a range of the amount of data within which the amount of data is located; and obtaining, according to the range of the amount of data, the adjusted bandwidth of the UE from a corresponding relationship between the range of the amount of data and the adjusted bandwidth.

15. The device according to claim 7, wherein the processor is configured to;

determine one or more carriers in the base station, which have operating frequencies that are within the frequency band range and are in an idle state;

form a first carrier set using one or more carriers, according to the frequency band range; and select from the first carrier set, according to the third operating bandwidth, at least one carrier of which the sum of the operating bandwidths is the third operating bandwidth.

16. The device according to claim 7, wherein the processor is further configured to:

obtain, according to a device identifier of the UE, the adjusted bandwidth of the UE from a corresponding relationship between the device identifier and the adjusted bandwidth.

17. The device according to claim 7, wherein the processor is further configured to:

determine, according to the amount of data, a range of the amount of data within which the amount of data is located; and obtain, according to the range of the mount of data, the adjusted bandwidth of the UE from a corresponding relationship between the range of the amount of data and the adjusted bandwidth.

* * * * *